(12) United States Patent
Matsur

(10) Patent No.: US 8,260,533 B2
(45) Date of Patent: Sep. 4, 2012

(54) TRAFFIC MONITORING SYSTEM

(76) Inventor: Igor Y. Matsur, Tula (RU)

( * ) Notice: Subject to any disclaimer, the term of this patent is extended or adjusted under 35 U.S.C. 154(b) by 294 days.

(21) Appl. No.: 12/752,248

(22) Filed: Apr. 1, 2010

(65) Prior Publication Data

US 2011/0246210 A1  Oct. 6, 2011

Related U.S. Application Data

(63) Continuation-in-part of application No. PCT/RU2007/000604, filed on Nov. 1, 2007.

(51) Int. Cl.
*G08G 1/00* (2006.01)

(52) U.S. Cl. ........ 701/117; 340/910; 340/933; 701/119; 705/1.1; 705/14.41

(58) Field of Classification Search ............... 340/425.5, 340/907, 937; 455/414.1; 702/159; 705/1.1, 705/14.41; 701/119
See application file for complete search history.

(56) References Cited

U.S. PATENT DOCUMENTS

| | | | |
|---|---|---|---|
| 5,568,406 A * | 10/1996 | Gerber | 702/159 |
| 5,734,337 A * | 3/1998 | Kupersmit | 340/937 |
| 6,226,497 B1 | 5/2001 | Guntzer et al. | |
| 7,801,512 B1 * | 9/2010 | Myr | 455/414.1 |
| 2002/0072847 A1 * | 6/2002 | Trajkovic et al. | 701/117 |
| 2004/0046646 A1 * | 3/2004 | Eskridge | 340/425.5 |
| 2005/0122235 A1 * | 6/2005 | Teffer et al. | 340/937 |
| 2006/0092043 A1 * | 5/2006 | Lagassey | 340/907 |
| 2006/0261979 A1 | 11/2006 | Draaijer et al. | |

FOREIGN PATENT DOCUMENTS

| | | |
|---|---|---|
| RU | 2084961 | 3/1992 |
| RU | 28256 | 3/2003 |
| RU | 2298215 | 9/2005 |
| RU | 62726 | 12/2006 |
| SU | 492211 | 5/1973 |

\* cited by examiner

*Primary Examiner* — George Bugg
*Assistant Examiner* — Sharmin Akhter
(74) *Attorney, Agent, or Firm* — Bardmesser Law Group

(57) ABSTRACT

The invention relates to traffic flow monitoring devices. The system includes stationary traffic monitoring points that includes reading devices to receive data from electronic tag located on a vehicle, and is connected to a remote server that includes a database of vehicles and associated electronic tags, and their owners. The stationary traffic monitoring points are in the form of autonomous small-sized computer devices with a cellular communication module, and includes automatic devices for photo-video-radar recording and for processing information about vehicles and traffic situation, and with automatic software tools for determining the parameters of the vehicles, traffic laws and for comparing them with the permissible parameters for the particular road section. Software tools can automatically qualify the violations of the traffic safety rules and contingency events and make decisions with respect thereto, and can automatically transmit information via a mobile communication network from stationary traffic monitors to transmitter/receiver of a nearest mobile communication operator and from there to the remote server via the Internet.

20 Claims, 2 Drawing Sheets

TRAFFIC MONITORING SYSTEM

This application is a continuation-in-part of PCT/RU/2007/000604, filed on Nov. 1, 2007, which is incorporated herein by reference.

FIELD OF THE INVENTION

The invention relates to devices for monitoring of traffic flow of vehicles, and can be used together with telecommunications systems for automatic traffic laws monitoring, automatic decision making regarding traffic laws violations and communication of those decision to traffic laws violators, without direct human intervention. Additionally, the system provides for automatic notification of law enforcement authorities regarding abnormal events on the roads, such as wrongful use of vehicle and control over decisions regarding violations of traffic laws.

DESCRIPTION OF THE CONVENTIONAL ART

Various automatic systems for traffic control are known, which were based on image identification, and include video cameras, computers for identifying the vehicles, each of which is connected over a wired connection to a video camera, and a server for control and search for the vehicle in a database. The server is normally connected to the computers using a local area network (see, for example, BAGS (Belgian Advanced Technology Systems S.A.), Pare Industriel de Recherches du Sart-Tilman, Avenue des Noisetiers 8, B-4031, Bangleur-Belgique).

However, such systems are typically only used for parked vehicles, or when the systems cross vehicle inspection stations, but not in conditions of multi-lane traffic.

Also known is a multi-zone system for monitoring movement of vehicles, which consists of multiple stationary control zones located on the roads, where each such control zone has a light source positioned above the road, video cameras for monitoring traffic and for identifying vehicles. The video cameras are angled downward relative to the horizontal plane, and with their objective lenses positioned facing the flow of traffic, as well as a control unit for coordination of the work of the video cameras. A remote computer center typically has a number of computers for identifying the vehicles, a server with a monitor for identifying and controlling the vehicles in the database, which is connected to the computers using a local area network. The video cameras are also connected to the computers, often using the same local area network (see WO93/19441, 1993). This system also suffers from the same disadvantages as the previously described system, and is primarily intended for identifying stolen vehicles. The system also requires significant human intervention and a substantial technological base.

A multi-zone traffic control system is known, that includes a mobile control checkpoint, and multiple stationary control zones, each of which is an approximate rectangle that encloses a particular local section of a road, and various switches located near the road at a predetermined distance from the rectangle. Each control zone has video cameras, lights, and a separator for traffic lanes and traffic directions. The system also includes computer hardware, installed on the mobile control checkpoint. The system also includes computers for identifying vehicles, which are connected to the video cameras through the switches, a server for searching and identification of the vehicles in the database, a local area network, a video monitoring system connected to the video cameras through the switches using a wired network, a connection to the telephone network, and a telecommunication system (see RU Patent No. 2137203).

This system, same as the system discussed above, is substantially a local system, requires additional investment in hardware, as well as lighting of the road sections being monitored, a substantial amount of wiring, and also typically requires human involvement in the use of the system.

An electronic identification system is known, that includes a personal computer connected to a server-collector that collects traffic and vehicle data, at least one, but usually three electronic marks or tags, installed on the vehicle, and a stationary device connected to the personal computer for collecting the information, typically employing a contact counter for reading the information stored in the tag. The tag, often attached near the license plate, contains information about the vehicle brand, color, engine power, vehicle identification number, registration and license plate number, as well as the date of the last vehicle inspection. A tag located on the front windshield, can include information about the vehicle brand, the registration number, owner information, information regarding the cargo being transported, cargo source and destination information, vehicle identification number, the location of repair facility, etc. A tag located under the hood or under the engine, or directly on the engine, can include information about the engine number, the chassis number, the car body number, engine power, and the year of manufacture of the vehicle. The system provides for expansion of functional capabilities by providing an ability to look for stolen vehicles, protection of registration and manufacturing information from forgery, protection of license plate from being stolen and placed on another vehicle, automatic control over cargo distribution, allocation of parking space and parking space rights, control over service requirements, rapid transmittal of full information regarding the owner of the vehicle in the event of an accident, military mobilization information, etc., see Russian Patent No. 2185663, 2002.

This system is also generally of local nature, and is typically used at police checkpoints, service stations, paid parking lots, etc. The system also generally requires human intervention, and is primarily directed to the location of stolen vehicles.

Features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

DETAILED DESCRIPTION OF THE PREFERRED EMBODIMENTS

Figure 1:
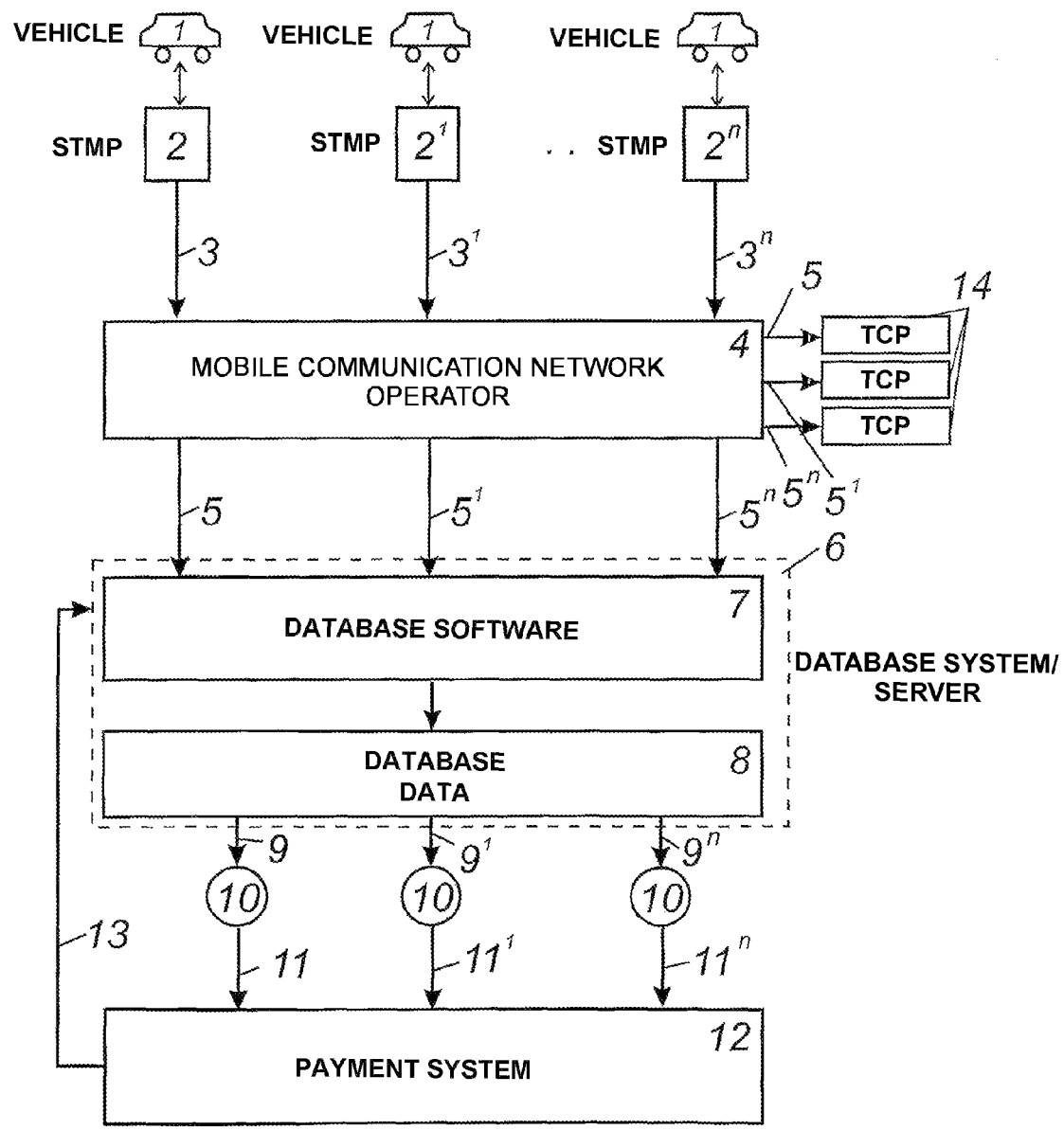
FIG. 1 illustrates the various elements of the system for monitoring traffic.

Reference will now be made in detail to the preferred embodiments of the present invention, examples of which are illustrated in the accompanying drawings.

One objective of the present invention is creating an automatic system for monitoring and controlling traffic laws compliance and for situational awareness on the roads, with a significant reduction in involvement of human personnel in providing road safety.

At the same time, the system is extremely cost effective, in terms of its configuration and use. An additional capability of the system is the fact that the system can be continuously expanded to include major roads, as well as minor roads, in a cost-effective manner.

The objective is achieved through the fact that in the system for monitoring traffic flow and controlling traffic laws compliance, vehicles can be equipped with devices for their identification by multiple stationary traffic monitoring points (STMP) to enable monitoring of vehicle traffic. The stationary traffic monitoring point is preferably in the form of an electronic device with a built-in module for a mobile communications network connection (e.g., a telephone or other one), and optional automatic electronic tag information and/or radar information and/or image information and/or video information collection and transmission, and processing of information regarding the vehicle and the road situation. The stationary traffic monitoring points are also provided with processing capability for analyzing information regarding the vehicle, the determination of the parameters of vehicle movement and traffic flow, and comparison of the information regarding vehicle movement with that permitted by traffic regulations for the particular section of the road. The system also includes software for automatic classification of traffic regulation violations as well as accidents, and making decisions regarding them, automatic transmission of information and the decisions regarding traffic regulations violators and accidents through a mobile communication network or similar, to a base station of the nearest mobile telecom operator, and ultimately, through the Internet, to a database system of a law enforcement agency.

The decision means can be provided either at the stationary traffic monitor or at the database system level.

Additionally, the system can be provided with software for communicating the information and decisions regarding the violations to the drivers or owners of the vehicles, such as through mobile communication network, or to either traffic control and/or police checkpoints.

Each stationary traffic monitoring point can be equipped with means for automatic reading of information regarding moving vehicles, for example, in the form of a photo camera working in the visible spectrum and/or at least one video camera working in the visible spectrum and/or at least one radio receiver and/or at least one radar and/or at least one infrared receiver, infrared locator and/or laser range finder and locator.

Each stationary traffic monitoring point can also be equipped with a threshold acoustic sensor for detection and/or identification of an approaching vehicle.

Also, each stationary traffic monitoring point can be provided with an autonomous or battery operated energy source.

Industrial Applicability

Figure 2:
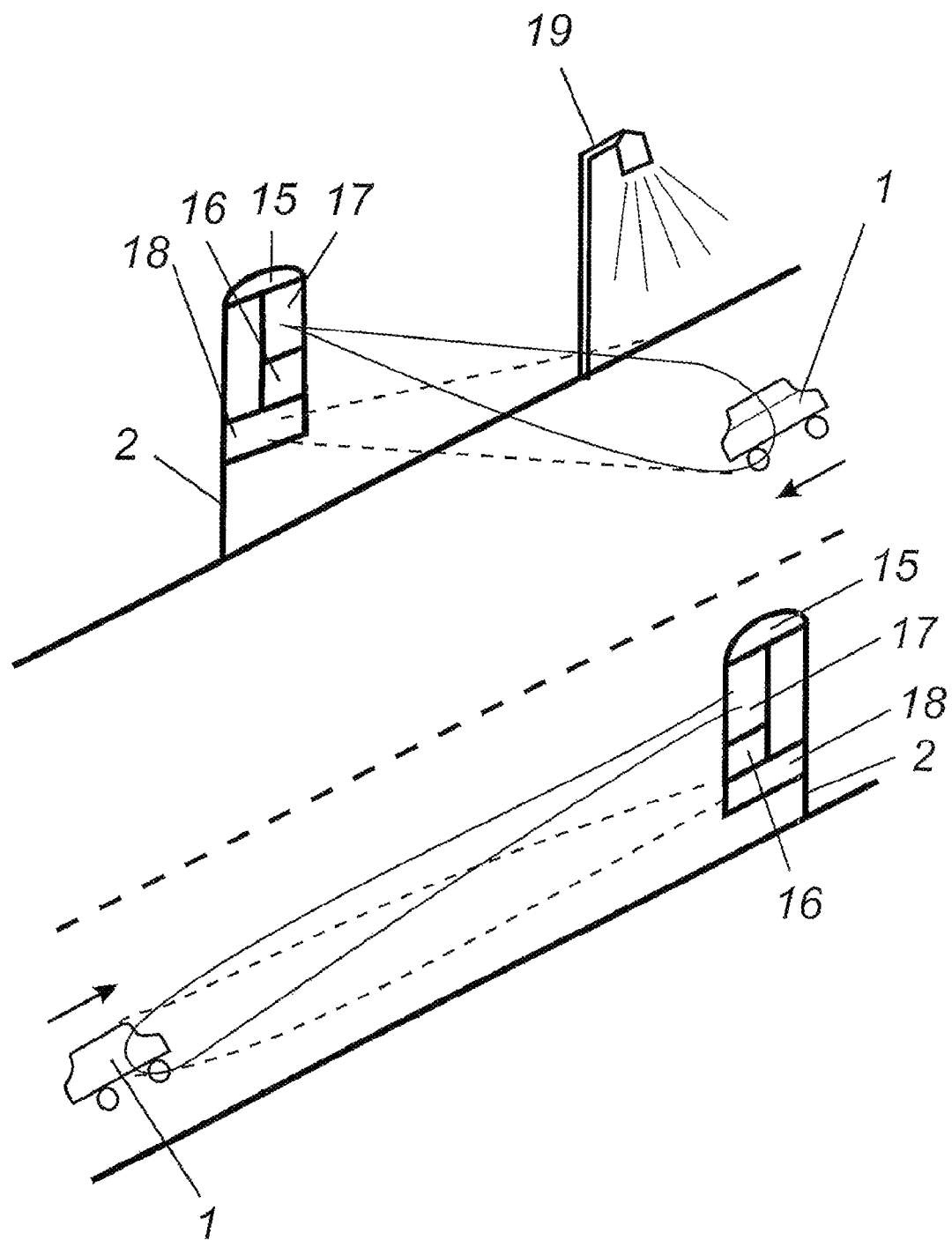
FIG. 2 illustrates schematically how a moving vehicle interacts with the system for monitoring traffic.

The proposed system is illustrated with FIGS. 1 and 2, where FIG. 1 shows a schematic of a control system for overseeing traffic flow and vehicle movement, and FIG. 2 shows a stationary traffic monitoring point for vehicle flow control.

The traffic monitoring system includes a plurality of stationary traffic monitoring points 2 ... 2'', which automatically receives information from moving vehicles, with subsequent determination of movement parameters of the vehicles 1 and comparison of the parameters to those permitted under traffic regulations for a particular road location. The system also includes an automatic determination of traffic regulation violations and analysis of accidents and other abnormal situations, and making decisions regarding the accidents and the abnormal situations, and subsequent transfer of the decisions and information regarding traffic regulations violators and the accidents and the abnormal situations up through the channels 3 ... 3'', such as through a mobile communication network (using Internet compatible protocols, such as GPRS, CDMA, wi-max, wi-fi or similar), to the nearest mobile communication network operator 4 ... 4'' and then subsequently through the Internet 5 ... 5'' to the server 6, which includes database software 7 and the database data 8, on a county, state and/or federal level.

The database system 6, based on the information and the decisions received from the stationary traffic monitoring points, can generate traffic citations regarding violations of traffic regulations, together with attached evidentiary information (photo, video, tag information, etc.), and using a global digital network 9 ... 9'' and 11 ... 11'' delivers the information to the violators, for example, through email or other electronic mechanism. The violator, having received the citation, will need to take some action, such as pay a fine, challenge the citation, etc. The response of the violator is received and processed in the database system 6, and payments are processed using a payment terminal 12, for example, through the communication channels 13.

To implement decisions regarding accidents and other "abnormal" events, the decisions can be sent directly to a police station or traffic control checkpoint (TCP) 14.

In the preferred embodiment, the stationary traffic monitoring point 2 can be in the form of a mobile telephone or a personal communicator, or similar form factor, or based on technology enabling mobile telephony, including a wireless connection module 15, a processor 16, that includes a module 17 for receiving data from the vehicle, for example, from a photo or video camera, a receiver, a transceiver, a radar or radio locator, an audio sensor 18 for detecting approach of a vehicle, etc.

If the reader described above requires daylight or similar conditions, then the area of the road may need to be illuminated during nighttime by lamp 19. The stationary control point may be placed on lamp posts, traffic sign posts, advertising billboards, etc.

The stationary traffic monitoring point can also be provided with means for remote reprogramming, for example, in the event of a change in the traffic regulations, speed limits, the situation on the road as it evolves dynamically, etc., for example, from another mobile phone, through Bluetooth protocol, through the infrared port, etc.

The stationary traffic monitoring point can also be installed in a concealed manner, in places that are inaccessible for easy discovery, damage and disassembly, and can be powered from a battery, from solar power, wind power, or from the electric power grid. Also, each vehicle can be equipped with an identification device (electronic tag), such as a radio frequency tag, in addition to the standard registration information, such as license plate, vehicle identification number, etc. The tag can include a radio transmitter, an infrared transmitter, a radio beacon, etc., such that the signal from the tag is received by the receiver 17 of the stationary control point 2.

The stationary traffic monitor works in the following manner:

When a vehicle approaches a stationary traffic monitoring point, the audio sensor 18 is triggered (for example, detecting ultrasound, infrasound, audible sound, etc.), which triggers a change in the stationary checkpoint from a passive mode through an active mode. The stationary checkpoint, in a preferred embodiment, reads the information from the vehicle, determines the parameters of vehicle movement, with a subsequent comparison of the parameters to those permitted under the traffic regulations, for the particular portion of the road, preferably automatically classifies the violation, and any accidents that might have occurred.

For example, in the case of a speeding violation, passing violation, failure to maintain proper lanes, etc., the stationary traffic monitoring point can itself automatically process the violation and issue the citation in electronic form, together with evidentiary information, such as photo and video records of the event, etc., and send the citation and the evidentiary information over the mobile communication network and the Internet to the database system 6.

Once the information is transmitted to the database system 6, the stationary traffic monitor can return to the passive mode.

The proposed invention provides for control over traffic flow, through the use of telecommunications system for automatic monitoring of traffic laws and regulations compliance, coupled with decisions that can be automatically made by the system regarding traffic violations, and also coupled with delivering the information and the traffic citations electronically, together with the evidentiary information, to the central database system and to the drivers. This can be done without direct involvement of human personnel.

Additionally, the system also provides for recognition and identification of accidents and other abnormal events on the road, as well as detection of vehicles being driven in an abnormal manner, such as aggressive driving, failure to maintain lanes, etc., as well as monitoring of traffic conditions. Also, the system permits monitoring for abnormal events relating to inconsistent information, such as an electronic tag that does not correspond to the license plate number, or data from different electronic tags being inconsistent with each other (possibly indicating a stolen vehicle), and the system can transmit this event to the nearest police checkpoint. The system also provides the checking of citations payment.

Having thus described a preferred embodiment of the computer network system of the present invention, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. An automatic traffic monitoring system, comprising:
   a plurality of remotely programmable stationary traffic monitoring points located in proximity to roads;
   a remote server in communication with the stationary traffic monitoring points and adapted to automatically issue citations for traffic laws violations;
   each stationary traffic monitoring point including a radio module for interfacing to a mobile communication network;
   each stationary traffic monitoring point including a module for automatically receiving information about a moving vehicle from the moving vehicle;
   each stationary traffic monitoring point including a module for automatically measuring movement parameters of the vehicle;
   each stationary traffic monitoring point including a processor for automatically determining whether the moving vehicle is in violation of traffic laws, for classifying traffic violations and for determining occurrence of abnormal events; and
   each stationary traffic monitoring point including means for automatic storing and transmitting information about the moving vehicle, the parameters of the moving vehicle and the determination to a remote server over the mobile communication network and then over the Internet.

2. The system of claim 1, further comprising means for transmitting the citations for traffic laws violation to owners of the vehicles.

3. The system of claim 1, further comprising means for checking whether the citation had been paid.

4. The system of claim 1, wherein the stationary traffic monitoring points include means for identification of a mismatch between at least some information received from the moving vehicles.

5. The system of claim 1, further comprising means for transmitting information of mismatch between at least some information received about the moving vehicles to law enforcement agents.

6. The system of claim 1, wherein the stationary traffic monitoring points include means for optical character recognition of license plate numbers of the vehicles.

7. The system of claim 1, wherein each stationary traffic monitoring point includes a module for receiving electronic tag data from a moving vehicle.

8. The system of claim 1, wherein the stationary traffic monitoring points include means for audio detection of an approaching vehicle, and wherein the stationary traffic monitoring points are in a passive mode until the means for audio detection detects the approaching vehicle.

9. The system of claim 1, wherein the stationary traffic monitoring point further comprises means for generating and transmitting image data about the moving vehicles.

10. The system of claim 1, wherein the stationary traffic monitoring point further comprises means for generating and transmitting video data about the moving vehicles.

11. The system of claim 1, wherein the stationary traffic monitoring point further comprises means for generating and transmitting radar speed measurement data about the moving vehicles.

12. The system of claim 1, wherein the stationary traffic monitoring point further comprises means for generating and transmitting laser speed measurement data about the moving vehicles.

13. The system of claim 1, wherein the stationary traffic monitoring point further comprises means for generating and transmitting infrared speed measurement data about the moving vehicles.

14. The system of claim 1, wherein the remote server automatically issues the citations upon receipt of information of the violation of traffic laws.

15. The system of claim 1, wherein each stationary traffic monitoring point includes a battery for autonomous operation.

16. The system of claim 1, wherein each stationary traffic monitoring point stores a video recording of the traffic laws violations.

17. The system of claim 1, wherein the abnormal situations include aggressive driving.

18. The system of claim 1, wherein the abnormal situations include failure to maintain lanes.

19. The system of claim 1, wherein the system also monitors traffic conditions.

20. The system of claim 1, wherein the abnormal situations include a mismatch between a license plate of the vehicle and electronic tag data received from the vehicle.

* * * * *